Nov. 20, 1923.
W. E. PARNELL
MILK BOTTLE HANDLE
Filed Oct. 4, 1921
1,474,685
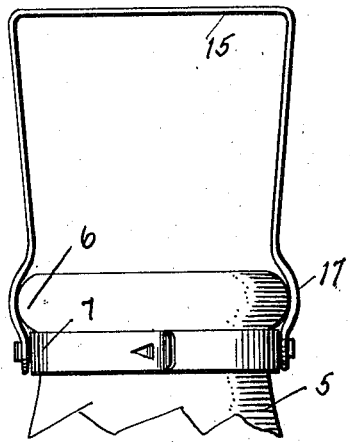
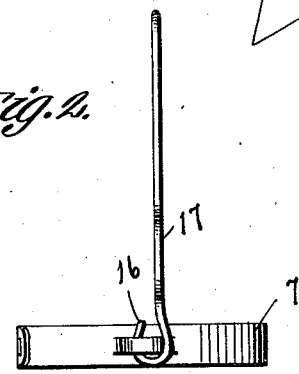
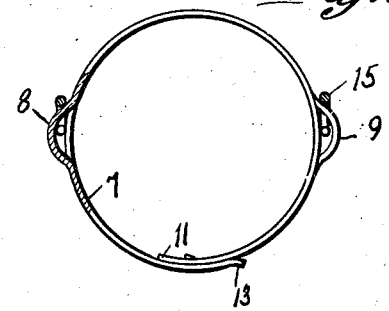
WITNESSES
Inventor
WILLIAM E. PARNELL
By Richard B. Owen
Attorney Patented Nov. 20, 1923.

1,474,685

UNITED STATES PATENT OFFICE.

WILLIAM E. PARNELL, OF ST. PAUL, MINNESOTA.

MILK-BOTTLE HANDLE.

Application filed October 4, 1921. Serial No. 505,347.

*To all whom it may concern:*

Be it known that I, WILLIAM E. PARNELL, a citizen of the United States, residing at St. Paul, in the county of Ramsey and State of Minnesota, have invented certain new and useful Improvements in Milk-Bottle Handles, of which the following is a specification.

This invention relates to a milk bottle handle and more particularly to a novel and improved carrier adapted to be attached to the neck of a conventional glass milk bottle, whereby the same may be conveniently carried without danger of dropping the same.

The primary object of the invention resides in the provision of a resilient, preferably metallic carrier, in the form of a band, adapted to be secured to the neck of a milk bottle and provided with a bail, loosely and detachably carried thereby, whereby the contents of the bottle may be poured out, without removing the said carrier therefrom.

Another and very important object of the invention is the provision of a milk bottle carrier of the type above set forth, adapted to be stamped from a strip of resilient material, and one in which the parts are extremely simple in construction, easily assembled, rigid and durable, highly efficient in operation, practical and capable of being manufactured at a very low cost, whereby its commercial possibilities are greatly enhanced.

The invention will be best understood from a consideration of the following detailed description taken in connection with the accompanying drawing forming a part of this specification, with the understanding, however, that the invention is not confined to any strict conformity with the showing in the drawing, but may be changed and modified so long as such changes and modifications mark no material departure from the salient features of the invention as expressed in the appended claims.

I attain these objects and others in the accompanying drawing, wherein:

Figure 1 shows the invention as applied to a conventional milk bottle.

Figure 2 is a side view of the carrier.

Figure 3 is a plan with the bail shown in section, and

Figure 4 is a sectional view of the locking device for the carrier.

Referring now to the drawing, wherein like reference characters designate corresponding parts throughout the several views, 5 designates the neck of a portion of a milk bottle provided with a beveled, enlarged top 6 thereof, to which the invention is to be applied. The carrier primarily consists of a band of resilient material 7, having outwardly struck, oppositely disposed, loops 8, 9. A V-shaped slot 10 formed in proximity to one end 11 of the strip is adapted for locking engagement with the inwardly struck portion 12 of the end 13, whereby said carrier may be easily locked and secured to the neck of the bottle, as clearly shown by the drawing.

The bail or carrier 15 is provided with hook portions 16 for engaging the loops, the arms of said bail being bent outwardly, as shown at 17, to grip and engage the enlarged portion 6 of the bottle, whereby the carrier will properly hold the bottle in position. By reason of the resiliency of the strip 7 and the bail 15, it will be readily seen that the said bail permits of the tilting of the bottle when it is desired to pour the contents thereof, without removing the carrier therefrom. The locking device is such that sufficient play is had to permit of the attachment of the carrier to various sized bottles in properly gripping the same, whereby they may be conveniently carried by the bail, without danger of dropping.

In the actual use of the carrier, when it is desired to attach it to a bottle, the bail is fastened to the loops 8, 9, whereupon the band is positioned on the neck of the bottle and locked thereto. The upward swinging movement of the bail 15 not only grips the enlarged portion 6 of the bottle but also tends to slightly spread the ends 11, 13 of the strip 7 to more securely lock the same in position.

In the accompanying drawings, I have illustrated my invention embodied in one form by way of example, and which in practice has been found to be highly satisfactory in obtaining the desired results. It will be obvious however, that other embodiments may be adopted, and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

Having thus described and illustrated my invention, what I claim as new and desire to secure by Letters Patent is:

1. The combination with a milk bottle including a neck having an enlarged bead on the upper end thereof, of a carrier for the bottle comprising a band adapted to encircle the neck below the bead, a pair of diametrically disposed loops carried by the band disposed inwardly of the bead, a bail including a pair of arms having the lower terminals thereof connected with the loops, and arcuate bowed portions formed in the arms of the bail for encircling and frictionally engaging the bead on the bottle neck, whereby central movement of the bail is prevented.

2. As a new article of manufacture, a carrier for milk bottles comprising a resilient open band having its terminals disposed in overlapping relation, one terminal of the band being provided with a slot, and a struckout locking tongue formed on the other terminal of the band for engaging in the slot, diametrically disposed struckout ears formed on the band, and a bail carrying handle receiving said ears, the arms of the bail handle being provided with bowed portions for receiving the bead formed on the neck of a milk bottle.

In testimony whereof I affix my signature in presence of two witnesses.

WILLIAM E. PARNELL.

Witnesses:
JOHN L. PARNELL,
THOMAS RYAN.